3,483,026
TAR BEARING REFRACTORY SHAPE COATED WITH A LATEX-TYPE PAINT
Ernest P. Weaver, Pittsburgh, Pa., assignor to Harbison-Walker Refractories Company, Pittsburgh, Pa., a corporation of Pennsylvania
No Drawing. Filed May 2, 1966, Ser. No. 546,501
Int. Cl. C04b 35/52; C09d 3/74, 3/36
U.S. Cl. 117—161                    2 Claims

ABSTRACT OF THE DISCLOSURE

A refractory shape containing a cokable, carbonaceous material and having a film coating substantially sealing its exposed surfaces, said film being the residue of a latex-type paint.

---

This invention relates to coated, tar impregnated, tar-bearing, preferably burned hydration resistant refractory shapes.

Generally, refractory shapes may be termed chemically bonded or ceramically bonded. The chemically bonded shapes are green or unfired shapes that are put into service in this form, relying on in situ burning for forming a permanent bond between the particles. Ceramically bonded shapes are preformed shapes (as by pressing) of refractory grains subjected to an elevated burning temperature to obtain a ceramic bond between adjacent particles throughout the shape.

The bond between the particles of a refractory shape is a most important property since it retains the relative position of the refractory particles maintaining the configuration of the shape. Also, the bond must be strong and relatively stable to permit handling of the shapes for and during shipment and during actual construction of the vessel in which it is placed, and to provide a shape which stands up in service without spalling or peeling or breaking away.

In the steel industry, typically, the lining of oxygen converters has been made of basic refractories because the slag of the oxygen steelmaking process is, itself, basic. Prior refractories most commonly used are those consisting essentially of tar impregnated or tar bonded dead burner magnesite, dead burned dolomite, and sometimes with lime mixed in the foregoing refractories. Baked tar-bearing basic brick are also used. This invention relates to burned or ceramically bonded and baked tar-bearing shapes, and particularly those burned shapes which are tar impregnated basic refractories. An example of a good tar impregnated dead burned magnesite refractory is one made according to the teachings of United States Patent No. 3,106,475, the assignee of which is assignee of the present application. The refractory shapes defined in said patent are particularly adapted to manufacture by conventional techniques using commercially available materials. One of the outstanding properties of these shapes is resistance to impact, abrasion and spalling. These refractory shapes are characterized by good strength at room temperatures.

Ceramically bonded, dead burned magnesite refractory shapes have good hydration resistance. As noted, such ceramically bonded shapes are tar impregnated for use in high temperature oxygen steelmaking vessels. The refractory shapes are impregnated, in more general terminology, with a cokeable non-aqueous, carbonaceous material which may be coal tar, a petroleum tar, pitch and the like. The brick are usually impregnated by immersion in the carbonaceous material which has been heated up to about 400° F. When powdered bond pitch (as for example, defined in United States Patent 3,070,449) is used it may be dissolved in an organic solvent which may be heated, or it may be directly liquefied by heating to an elevated temperature. The heated and liquefied carbonaceous material penetrates into the brick and generally throughout the cross-section to obtain uniform distribution of the carbonaceous material. The carbonaceous material forms a thin layer of substantially uniform thickness around the exterior surfaces, and in and around the grains internally of the shape. The pitch, tar or other cokeable non-aqueous carbonaceous material contributes to the ability of the refractory to resist chemical attack by molten slag. This carbonaceous material decomposes on heating and the resultant carbon is deposited within the pores and around the brick grains.

The carbonaceous material, particularly pitch and tar, contains organic materials some of which are volatile or otherwise are secreted from the shape at ambient temperatures. These organic materials can tend to cause dermatitis or skin irritation in workers handling the shapes. This has been a problem in installations which use large volumes of refractory in furnaces, kilns and the like. The tars or pitch contain higher molecular weight organic compositions and some lower molecular weight compounds which have a fairly high partial vapor pressure so as to be at least patrially volatile at ambient temperature. Some of the organic compounds are absorbed through the skin on contact with the liquid or volatile compounds. An increase in the ambient temperature increases the release of deleterious organic materials from the "tar impregnated refractory shapes." Such refractories are commonly used to line at least partially closed vessels, and sometimes the temperature in such vessels tends to be high, increasing the concentration of the volatile organic materials in the ambient atmosphere in the vessel. Thus workers in such enclosed areas can be subjected undesirably to breathing the volatile organics and to physical contact with the increase of organics which exude from the shape on the increase of temperature.

It is, therefore, an object of the present invention to provide a tar-bearing refractory shape, impregnated with a cokeable, nonaqueous carbonaceous material, and coated with a "latex" type paint to provide an impervious skin or coating to seal in organic materials including residual volatiles in the cokeable non-aqueous carbonaceous material therein. In one concept, a ceramically bonded, basic refractory shape having pitch incorporated therein is coated with an inorganic-pigment-containing latex type paint to provide a barrier against moisture penetration and prevent the release of organic materials from the carbonaceous material incorporated therein. By "latex" type paint I mean to describe water dispersions of selected natural and/or synthetic polymers which have the desired coating properties herein defined. Examples of the polymers include polyvinyl acetate, polyvinyl chloride, copolymers of these with monomers such as acrylates, etc.

A further object of the invention is to provide a coated ceramically bonded, basic refractory shape which has incorporated therein a non-aqueous cokeable carbonaceous material, the coating of which provides an economical, tough, continuous film over the exposed surfaces of the shape to prevent secretion of organic materials from the carbonaceous material incorporated in said shape.

A still further object of the invention is to provide a ceramically bonded basic refractory shape having incorporated therein a non-aqueous cokeable carbonaceous material coated with a thin film of latex paint which may be variously pigmented for identification of the type of refractory shape, and which, also, provides a barrier to the release of volatile organic materials from the shape during handling.

Further objects and advantages will be apparent from the following description and examples which are intended as an illustration of the invention and not as a limitation of the scope thereof.

Basically, refractory shapes, particularly brick, are not made of a homogenized mass of refractory particles. Such shapes are made of mixtures of size graded particles, commonly called grains, some of which may be coarse and some fairly fine, along with very fine material. The use of the various sizes of graded materials produces a dense pack of particles, but it also produces a rough surface because of the protruding coarse particles since the fine particles cannot fill all the voids and depressions on the surfaces.

For purposes of the invention, refractory shapes are prepared from size graded, dead burned magnesite. An exemplary and preferred magnesite used for preparing the shapes has the following chemical analysis:

TABLE I

| Grain: | Percentage |
|---|---|
| $SiO_2$ | 0.9 |
| $Al_2O_3$ | 0.4 |
| $Fe_2O_3$ | 0.3 |
| $CaO$ | 1.1 |
| $MgO$ | 97.3 |

All parts are by weight and on the basis of the oxide analysis. The size grading of the magnesite grains typically is substantially as follows:

TABLE II

| | Percentage |
|---|---|
| Minus 4 on 10 mesh | 30 |
| Minus 10 on 28 mesh | 35 |
| Minus 65 mesh to ball mill fines | 35 |

(Standard Tyler screen sizes)

In a preferred embodiment, the materials are dry mixed for about 5 minutes and then for an additional 5 minutes while adding about 2 parts of lignin liquor and about 2 parts of water, based upon the total weight of the mixture, as a tempering fluid. Brick are made from the batch by pressing on a power press at 8000 p.s.i., and are burned at cone 23 (about 2820° F.).

Brick made as above are impregnated with tar; the usual amount of tar for impregnating the brick runs between 4 and 10%, by weight, and preferably the tar content should be 6 to 8%. Commercially available tar or pitch of petroleum or coal base may be used for the impregnation. It is preferable, however, to use a coal base, powdered pitch having a softening point on the order of 150° F. The pitch is melted and heated to about 400° F. and the brick are immersed in the tar for between 1 and 5 minutes to provide impregnation of the shapes with the pitch to about 6 to 8% of pitch by weight.

Tar impregnated burned magnesite refractory brick, having the dimensions of 9 by 4½ by 3 inches calculated to have a surface area of 1.125, are coated with a latex paint. The following measurements indicate the quantity of paint picked up in exemplary testing by such brick:

TABLE III

| | Sample 1 | Sample 2 |
|---|---|---|
| Brick Weight, Pounds: | | |
| Initial | 13.20 | 13.07 |
| After Coating | 13.30 | 13.13 |
| Weight Gain (Dry Basis): | | |
| On brick (average) | 0.08 | |
| Per sq. ft. of brick | 0.071 | |

The latex paint which may be used for coating the brick to prevent the release of deleterious vapors from the tar impregnated brick may be substantially any type of latex paint, which is normally a latex in solution with a pigment. In addition to keeping in vapors, it prevents contact between the tar and workers' hands, etc. Generally, such latex paint is quite inexpensive and normally weighs in the neighborhood of 9 to 13 pounds per gallon. The inorganic pigments may be conventional pigments, such as titanium dioxide and the like, to give covering power for the paint. The latex is usually in a water vehicle with resins and proteins to maintain the emulsion with the pigments. The latex paint may be white or may be colored, as desired by the user, and is controlled by the pigmentation. Colored latex paint may be used for the coating of brick, whereby the colors may be used as a color code to indicate particular types of brick. Further, one may use the latex paint vehicle with no pigment thereby providing a colorless coating.

One very effective latex paint is one which has the following approximate analysis of ingredients:

TABLE IV

Pigment to make 40.3% by weight of the paint is composed of:

| | Percent |
|---|---|
| $TiO_2$ | 21.5 |
| $CaCO_3$ | 46.2 |
| $SiO_2$ | 32.3 |

Vehicle to make 59.7% by weight of the paint is composed of:

| | Percent |
|---|---|
| Non-volatile materials (polyvinyl acetate homopolymer) | 15.6 |
| Volatile (water) | 84.4 |

Other synthetic latex paints, and paints with more or less pigment may be used for coating the brick according to the invention.

Since the normal latex paint as defined above is a water emulsion of high solid content, the bricks, after coating, either by painting, dipping or the like, dry to the touch rapidly. The coating is a durable, smooth coating which remains intact for handling, shipping, and in erection of the lining of the vessels. Even more important—the paint remains as an effective coating well above 600° F. Also, there is no apparent objectionable odor. Using the preferred exemplary paint described above at 300° F., a slight acetate odor is noted and at about 450° F. a burnt carmel aroma is noted. At 600° F. there is a darkening of the coating. At 900 to 1000° F. there is still no indication of smoke or fume. The foregoing indicates that no particular problem of smoking or odor occurs with the instant coating. Thus, the coating is "heat stable" through the ambient conditions usually found in lining oxygen converter vessels. Following the completion of the lining in the vessel, the initial firing of the vessel eventually burns the latex and volatilizes the organic materials. The inorganic pigment may remain generally in place on the lining or be removed by the slag in the furnace.

The latex paint is very effectively used with the burned ceramically bonded magnesite brick, since the latex paint is a water vehicle paint, and such burned brick are not subject to hydration from the water in the paint. It is equally effective with other types of burned, hydration resistant refractory shapes which are tar impregnated. For example, it is effective with tar impregnated high alumina shapes. It can be used in the same way with silica, fireclay, zircon, zirconia, etc. The inorganic pigment is a major part of the cost of the coating; therefore, the type and amount of pigment in the latex paint generally controls the cost of the coating, whether based on the brick or the square foot area. Dipping the shape in the paint, and insuring complete submergence, produces a continuous film over the exposed surfaces of the shape. With care, painting with a brush or spraying may, likewise, be used to provide a continuous film. With a sufficient film to retain the organics in the shape, the outside of the shape is smooth and tough.

While the invention has been illustrated by reference to specific embodiments, there is no intent to limit the spirit or scope of the invention to the precise details so set forth.

I claim:
1. A tar-bearing, hydration resistant, refractory shape containing a non-aqueous, cokeable carbonaceous material including organic materials which are secreted from said carbonaceous material and tend to cause skin irritation; and a thin, hard, continuous film coating said shape sealing its exposed surfaces from the release of organic materials from said shape, said film being relatively heat stable and being the dried and heat set residue of a latex-type paint which consists essentially of a minor but effective amount of a mixture of $TiO_2$, $CaCO_3$, and $SiO_2$, and a major amount of a mixture of polyvinyl acetate homopolymer and water, said latex-type paint being stable up to about 1000° F.

2. A tar-bearing, hydration resistant, refractory shape containing a non-aqueous, cokeable carbonaceous material including organic materials which are secreted from said carbonaceous material and tend to cause skin irritation; and a thin, hard, continuous film coating said shape sealing its exposed surfaces from the release of organic materials from said shape, said film being relatively heat stable and being the dried and heat set residue of a latex-type paint which consists essentially of about 40 percent by weight of a mixture of $TiO_2$, $CaCO_3$, and $SiO_2$, and about 60 percent by weight of a mixture of polyvinyl acetate homopolymer and water, said latex-type paint being stable up to about 1000° F.

References Cited

UNITED STATES PATENTS

| 1,765,748 | 6/1930 | Teague | 117—28 |
| 3,002,940 | 10/1961 | Holloway | 117—123 X |
| 3,070,449 | 12/1962 | Davies et al. | 106—61 X |
| 3,106,475 | 10/1963 | Davies et al. | 117—113 X |
| 3,316,200 | 4/1967 | Hatala | 117—123 X |

FOREIGN PATENTS

| 528,750 | 11/1940 | Great Britain. |
| 804,358 | 11/1958 | Great Britain. |
| 570,049 | 2/1959 | Canada. |
| 570,431 | 2/1959 | Canada. |

WILLIAM D. MARTIN, Primary Examiner

M. R. LUSIGNAN, Assistant Examiner

U.S. Cl. X.R.

106—56, 58; 117—123; 264—62